J. H. ARMSTRONG.
RIM REMOVER FOR WHEELS.
APPLICATION FILED NOV. 30, 1917.

1,274,494.

Patented Aug. 6, 1918.

WITNESSES
W. C. Fielding.
B. F. Garvey Jr.

INVENTOR
John H. Armstrong
BY
Richard Bowen.
ATTORNEY

UNITED STATES PATENT OFFICE.

JOHN H. ARMSTRONG, OF CLOQUET, MINNESOTA.

RIM-REMOVER FOR WHEELS.

1,274,494.   Specification of Letters Patent.   Patented Aug. 6, 1918.

Application filed November 30, 1917. Serial No. 204,763.

*To all whom it may concern:*

Be it known that I, JOHN H. ARMSTRONG, a citizen of the United States, residing at Cloquet, in the county of Carlton and State of Minnesota, have invented certain new and useful Improvements in Rim-Removers for Wheels, of which the following is a specification.

This invention relates to tire rim removing and replacing tools, having for its object to provide a tool which will greatly facilitate removal of the rim from the wheel and will likewise facilitate engagement of the rim with the wheel.

Another object is to provide a very simple tool which may be conveniently carried in the tool box of the automobile, which may be successively used by a novice, both for removing and replacing the rim, and which may be manufactured at a very low cost.

The above and other objects and advantages of this invention will be in part described and in part understood from the following description of the present preferred embodiment, the same being illustrated in the accompanying drawings, in which:—

Figure 1:
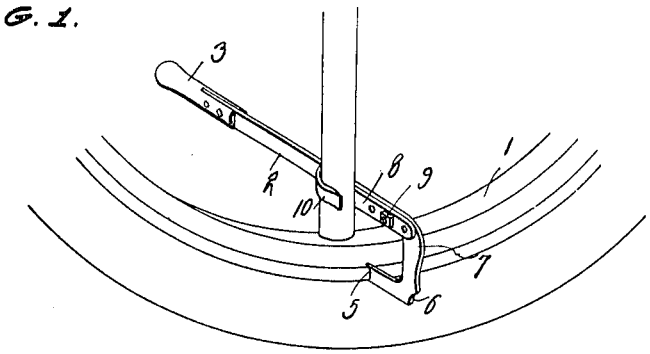
Figure 1 is a perspective view of a rim remover and replacer constructed in accordance with my invention and illustrating the application of the same on a portion of a wheel, an inside view of the latter being shown.
Figure 2:
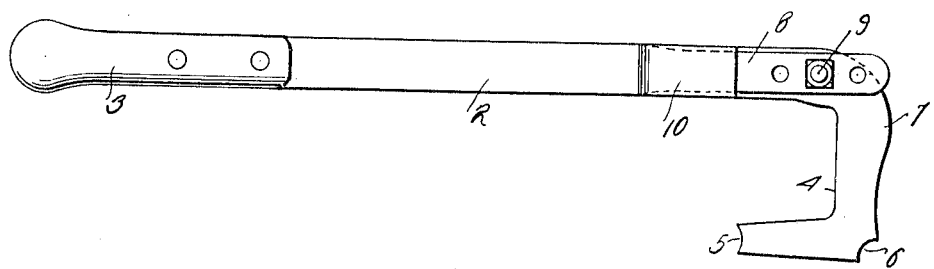
Fig. 2 is a side elevational view of the tool.
Figure 3:
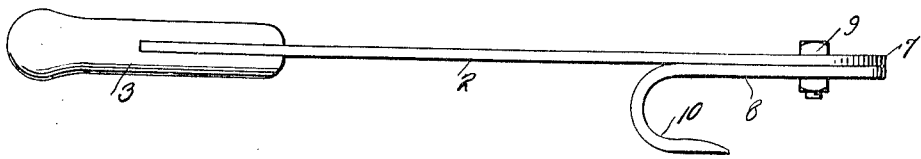
Fig. 3 is a top plan view of the same.

In the drawings in order to illustrate the application of my invention a portion of a wheel 1 is shown upon which the usual tire and rim is mounted.

The tool constructed in accordance with my invention consists of a body or shank 2 which in this instance comprises an elongated bar preferably flat in cross section and equipped on one end with a handle 3. The opposite end is bent at an angle so as to provide a bell crank lever 4 which is integrally formed on the shank 2 thereby providing a structure substantially U-shaped in elevation. The free terminal of the bell crank lever is recessed as indicated at 5 to provide a seat for the inner margin of the wheel rim. A recess 6 is formed in the outer margin of the bell crank lever 4 at the angle of the latter and provides a seat for the reception of the outer margin of the rim when the tool is used as a rim replacer. It will also be noted that the outer margin of the bell crank lever, adjacent its jointure with the shank 2 is arcuate as at 7, so that in an emergency the tool could be used as the jack in which case the part 7 may be placed in contact with the support upon which the vehicle is located, and the free terminal of the bell crank lever engaged with the tire or some part of the wheel adjacent the support. The part 7 will act as a fulcrum to facilitate operation of the handle 3.

A metal strap 8 is provided one end of which has a plurality of apertures formed therein any one of which is registerable with an opening formed in the shank 2 adjacent the jointure of the latter with the bell crank lever 4. Said openings are adapted to receive the shank of a bolt 9 which serves as an axis about which the shank moves when pressure is exerted on the handle 3. The inner end of the strap 8 is bent to form a hook 10 which embraces a spoke of the wheel 1 as shown to advantage in Fig. 1.

In use of this device as a rim removing tool the tool is associated with the wheel in the manner illustrated to advantage in Fig. 1. In this position it will be seen that the recess terminal 5 of the bell crank lever is engaged with the inner margin of the rim of the wheel, and the hook 10 engaged with a spoke of the wheel. When in this position upward pressure on the handle 3 will cause the rim to be forced outwardly from the wheel. When the tool is used as a rim replacer, the recess 6 is engaged with the inner margin of the rim and the strap 8 turned a semi-revolution on its axis, in which position the hook 10 will be on a line substantially coincident with the longitudinal axis of the shank 2. The hook when in this position is of course engaged with one of the spokes, and a downward pressure on the handle 3 will cause the rim to be forced inwardly on the wheel. It is of course understood that by providing a plurality of apertures in the strap 8, an adjustment of the latter may be had so as to conform to wheels of various sizes.

It will be understood that the above description and accompanying drawings comprehend only the general and preferred embodiment of my invention and that various minor changes in details of construction, proportion and arrangement of parts may be made within the scope of the appended claims without sacrificing any of the advantages of my invention.

I claim:—

1. A wheel rim remover including a shank equipped with a handle on one end and having a U-shaped extension on its opposite end, the terminal of which is recessed to receive the rim when the latter is to be removed, said extension having a recess at one of its angles to engage the rim when the latter is to be replaced on the wheel, and a spoke engaging means adapted to lie in a horizontal position in relation to the shank.

2. A wheel rim remover and replacer including a shank provided with a U-shaped extension, said extension having a plurality of recesses for engaging with the rim, an adjustable metal strap having a hook on one end and said strap being pivotally connected to one side of said shank adapted to lie in a longitudinal position in relation to the shank.

In testimony whereof I affix my signature in presence of two witnesses.

JOHN H. ARMSTRONG.

Witnesses:
W. H. KEMP,
BEATRICE A. PARKS.